United States Patent
Gedik et al.

(10) Patent No.: US 9,112,666 B2
(45) Date of Patent: *Aug. 18, 2015

(54) ELASTIC AUTO-PARALLELIZATION FOR STREAM PROCESSING APPLICATIONS BASED ON MEASURED THROUGHPUT AND CONGESTION

(71) Applicant: International Business Machines Corporation, Armonk, NY (US)

(72) Inventors: Bugra Gedik, Ankara (TR); Martin J. Hirzel, Ossining, NY (US); Scott A. Schneider, White Plains, NY (US); Kun-Lung Wu, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/023,655

(22) Filed: Sep. 11, 2013

(65) Prior Publication Data

US 2014/0359271 A1 Dec. 4, 2014

Related U.S. Application Data

(63) Continuation of application No. 13/903,211, filed on May 28, 2013.

(51) Int. Cl.
*G06F 11/00* (2006.01)
*H04L 5/00* (2006.01)
*H04L 29/08* (2006.01)
*G06F 9/445* (2006.01)

(52) U.S. Cl.
CPC .............. *H04L 5/0064* (2014.11); *G06F 9/445* (2014.11); *H04L 67/1002* (2014.11)

(58) Field of Classification Search
CPC ........................... H04L 67/1002; G06F 9/445
USPC .................... 398/45; 370/230, 229, 252, 468; 709/231, 226; 719/313
See application file for complete search history.

(56) References Cited

U.S. PATENT DOCUMENTS

| | | | |
|---|---|---|---|
| 5,600,808 A | 2/1997 | Kasukawa | |
| 6,192,514 B1 | 2/2001 | Lurndal | |
| 7,280,545 B1 | 10/2007 | Nagle | |
| 7,302,687 B2 | 11/2007 | Austin | |
| 7,461,376 B2 | 12/2008 | Geye et al. | |
| 7,633,940 B1 | 12/2009 | Singh et al. | |
| 7,684,332 B2 | 3/2010 | Ray et al. | |
| 7,707,578 B1 | 4/2010 | Zedlewski et al. | |

(Continued)

OTHER PUBLICATIONS

US OA dated May 16, 2014 corresponding to U.S. Appl. No. 13/903,211.

(Continued)

*Primary Examiner* — Thomas Lee
*Assistant Examiner* — Aurel Prifti
(74) *Attorney, Agent, or Firm* — F. Chau & Associates, LLC

(57) ABSTRACT

A method for adjusting a data parallel region of a stream processing application includes measuring congestion of each parallel channel of the data parallel region, measuring a total throughput of all the parallel channels, and adjusting the number of parallel channels based on the current measured congestion and throughput.

17 Claims, 9 Drawing Sheets

(56) References Cited

U.S. PATENT DOCUMENTS

| | | | |
|---|---|---|---|
| 7,808,918 B2 | 10/2010 | Bugenhagen | |
| 7,843,831 B2 | 11/2010 | Morrill et al. | |
| 7,917,905 B2 | 3/2011 | Itoh | |
| 7,948,909 B2 | 5/2011 | Bugenhagen et al. | |
| 8,000,318 B2 | 8/2011 | Wiley et al. | |
| 8,095,679 B1 | 1/2012 | Satish et al. | |
| 8,122,455 B2 | 2/2012 | Paul et al. | |
| 2002/0087611 A1 | 7/2002 | Tanaka et al. | |
| 2003/0126184 A1 | 7/2003 | Austin | |
| 2004/0071083 A1* | 4/2004 | Li et al. | 370/230 |
| 2005/0052992 A1 | 3/2005 | Cloonan et al. | |
| 2005/0235285 A1 | 10/2005 | Monasterio | |
| 2006/0010101 A1 | 1/2006 | Suzuki | |
| 2006/0106743 A1 | 5/2006 | Horvitz | |
| 2006/0212917 A1 | 9/2006 | Boucher et al. | |
| 2008/0049630 A1 | 2/2008 | Kozisek et al. | |
| 2008/0117931 A1* | 5/2008 | Beukema et al. | 370/468 |
| 2009/0052318 A1* | 2/2009 | Gershinsky et al. | 370/229 |
| 2009/0303882 A1 | 12/2009 | Tanaka et al. | |
| 2010/0254704 A1* | 10/2010 | Aoki | 398/45 |
| 2010/0278046 A1 | 11/2010 | Mateos Perez et al. | |
| 2011/0208872 A1* | 8/2011 | Liddell et al. | 709/231 |
| 2011/0243000 A1* | 10/2011 | Nagaraja | 370/252 |
| 2011/0247007 A1* | 10/2011 | Andrade et al. | 719/313 |
| 2011/0276690 A1* | 11/2011 | Whitehouse | 709/226 |
| 2012/0039169 A1* | 2/2012 | Susitaival et al. | 370/230 |
| 2012/0137018 A1* | 5/2012 | Uhlig et al. | 709/231 |
| 2013/0028083 A1* | 1/2013 | Yoshida et al. | 370/230 |

OTHER PUBLICATIONS

US OA dated Dec. 4, 2013 corresponding to U.S. Appl. No. 13/903,211.

A. Arasu, et al., "STREAM: The Stanford Stream Data Manager", Bulletin of the IEEE Computer Society Technical Committee on Data Engineering, IEEE Data Engineering Bulletin, vol. 26, 2003.

Bugra Gedik, et al., "SPADE: The System S Declarative Stream Processing Engine", SIGMOD '08, Jun. 9-12, 2008, Vancouver, BC, Canada.

Daniel J. Abadi, et al., "The Design of the Borealis Stream Processing Engine", Proceedings of the 2005 CIDR Conference.

Henrique Andrade, et al., "Scale-up Strategies for Processing High-Rate Data Streams in System S", pp. 1375-1378, IEEE IDCE 2009.

Kun-Lung Wu, et al., "Challenges and Experience in Prototyping a Multi-Modal Stream Analytic and Monitoring Application on System S", VLDB '07, Sep. 23-28, 2007, Vienna, Australia.

Matthew Curtis-Maury, et al., "Online Power-Performance Adaptation of Multithreaded Programs using Hardware Event-Based Prediction", ICS06, Jun. 28-30, 2006.

William Thies, et al., "StreamIt: A Language for Streaming Applications", Laboratory for Computer Science, Massachusetts Institute of Technology, Cambridge, MA, ICCC, Apr. 2002.

Scott Schneider et al., "Auto-Parallelizing Stateful Distributed Streaming Applications", PACT'12, Sep. 19-23, 2012, Minneapolis, Minnesota, USA.

Sai Wu, et al., "Parallelizing Stateful Operators in a Distributed Stream Processing System: How, Should You and How Much?", DEBS'12, Jul. 16-20, 2012, Berlin, Germany.

Scott Schneider et al., "Elastic Scaling of Data Parallel Operators in Stream Processing", IPDPS '09 Proceedings of the 2009 IEEE International Symposium on Parallel & Distributed Processing; pp. 1-12.

Mehul A. Shah, et al., "Flux: An Adaptive Partitioning Operator for Continuous Query Systems", Data Engineering, 2003. Proceedings 19th Conference on Mar. 5-8, 2003.

Michael Isard et al., "Dryad: Distributed Data-Parallel Programs from Sequential Building Blocks", EuroSys '07, Mar. 21-23, 2007, Lisbon, Portugal.

Norman W. Paton, et al., "Autonomic query parallellization using non-dedicated computers: an evaluation of adaptivity options", The VLDB Journal (2009) 18:119-140.

* cited by examiner

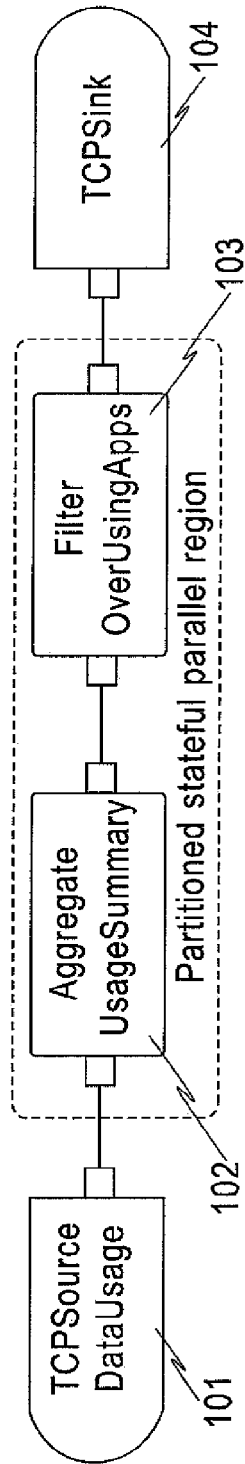
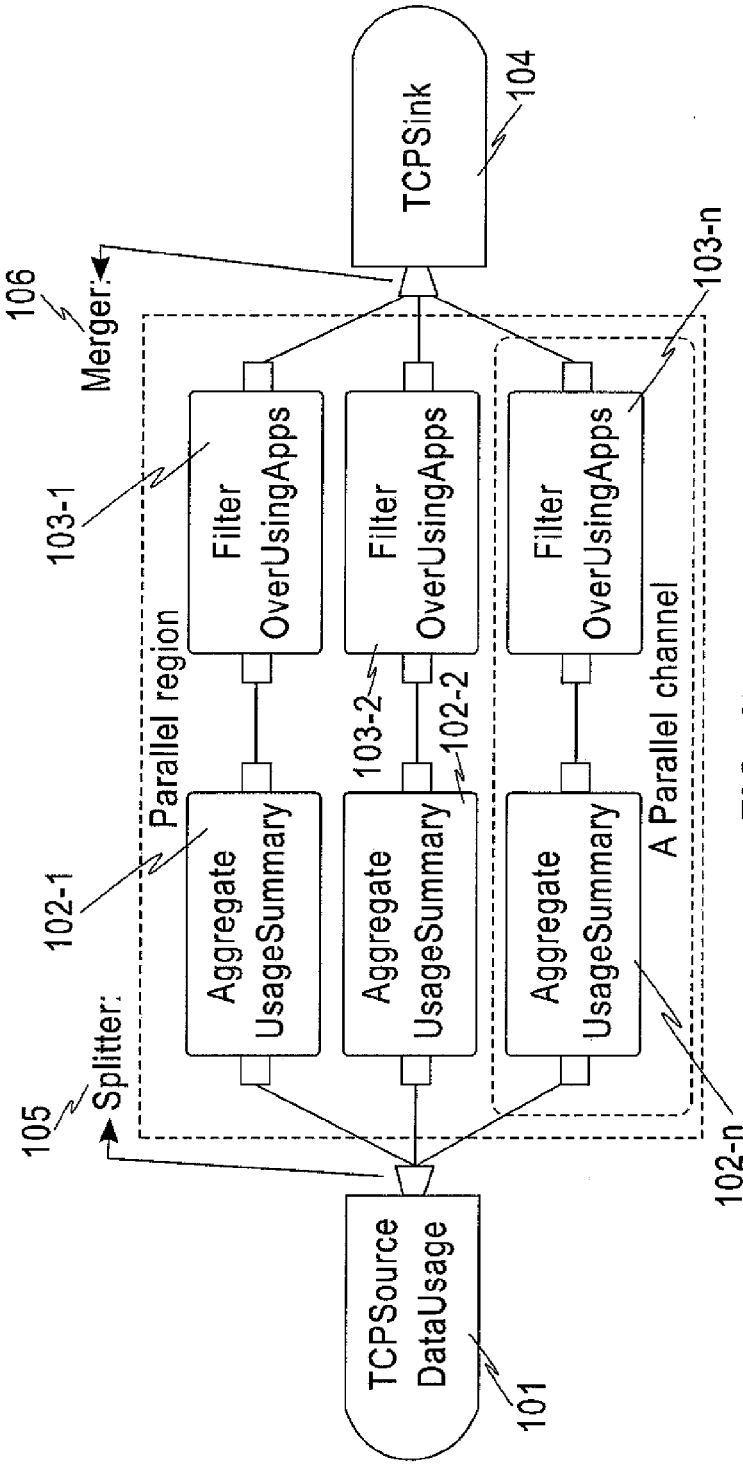
FIG. 1A
FIG. 1B

200

```
composite OpMon {
  param
    expression<float32> Sthreshold :
        (float32) getSubmissionTimeValue("threshold");
  type
    UsageDetailInfo = tuple<int32 srcIndex, timestamp time,
        int32 trafficSrc, int32 trafficDst, int32 appId,
        int32 appVersion, float32 flewAmount>;
    UsageSummaryInfo = tuple<int32 appId, float32 flowAmount,
        timestamp time>;
  graph
    stream<UsageDetailInfo> DataUsage = TCPSource() {       101
      param
        role: server; port: 40000; format: csv;
    }
    stream<UsageSummaryInfo> UsageSummary = Aggregate (DataUsage) {
      window
        DataUsage : tumbling, delta(time, 60.0), partitioned;
      param
        partitionBy: appID;
      output
        UsageSummary: flowAmount = Sum(flowAmount);         102
    }
    stream<UsageSummaryInfo> OverusingApps = Filter() {
      param                                                 103
        filter: flowAmount > Sthreshold;
    }
    () as Sink = TCPSink(OverusingApps) {
      param                                                 104
        role: client; address: "10.0.0.2" ; port: 40001;
    }
}
```

FIG. 2

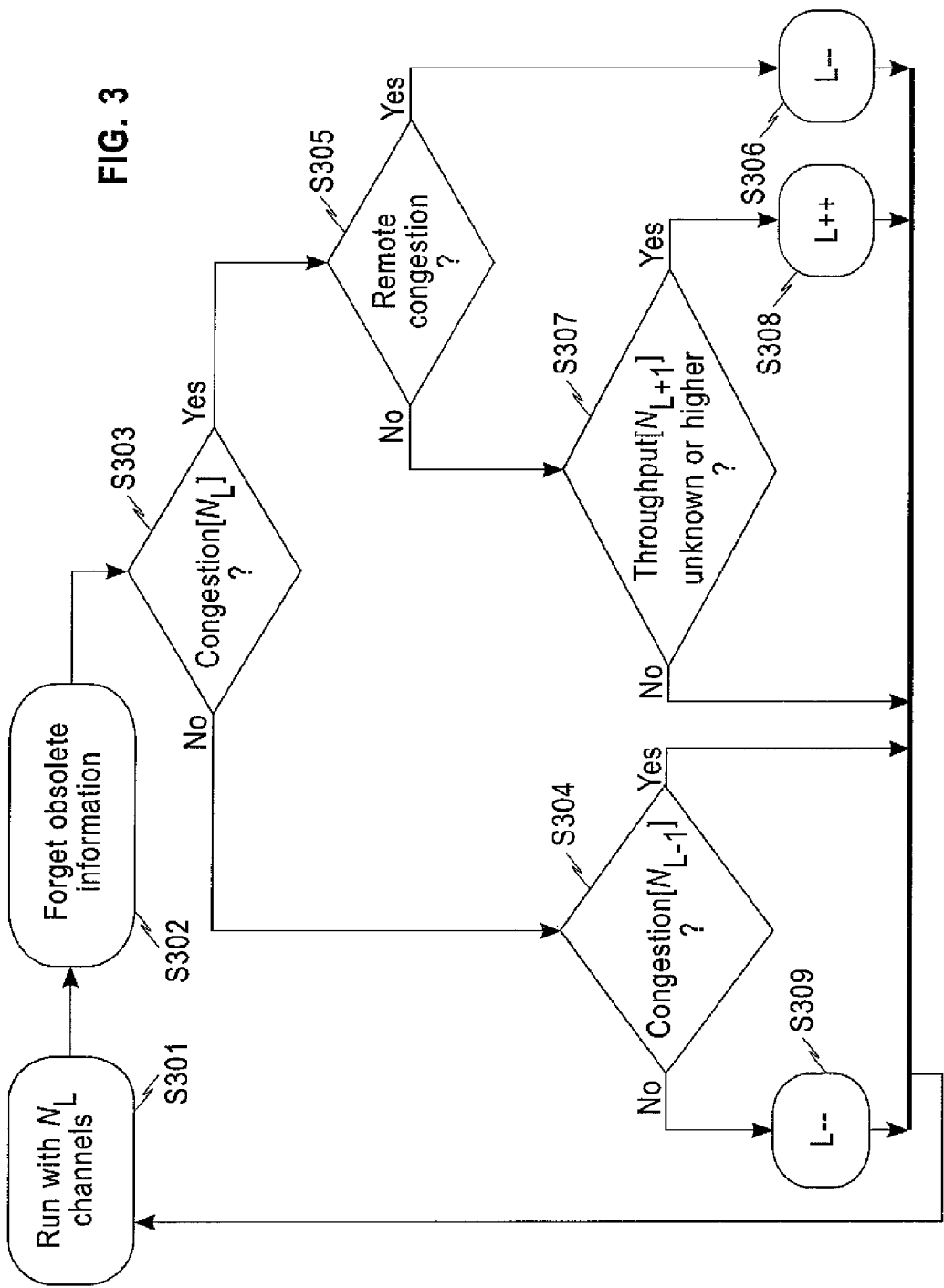

400

401
```
procedure init()
P ← 1; L ← 0;
∀_{i ∈ [0..L*)} (T_i^⊢ nan; T_i^⊣ ← ∞)
∀_{i ∈ [0..L*)} (C_i ← true; P_i ← -1)
s ← 0.1 + (1.0 - α) * 0.9
```

```
procedure getNumberOfChannels(T,C)
/* (P3) and (P4): congestion and throughput adapt */
I_c ← checkLoadChangeViaCongestion(C)
I_t ← checkLoadChangeViaThroughput(T)
if I_c = LessLoad or I_t = LessLoad
    ∀_{i ∈ [0..L)} C_i ← false; T_i^⊣ ← 0                       402
if I_c = MoreLoad or I_t = MoreLoad
    ∀_{i ∈ (L..L*)} C_i ← true; T_i^⊣ ← ∞
/* update info on current level */
P_L ← P; P ← P + 1
T_L^⊣ ← T; C_L ← C
if T_L^⊢ = nan then T_L^⊢ ← T
/* update the current level */
r ← (P_{L-1} = P_L - 1) and C_{L-1} and C_L and T_L^⊣ ≤ T_{L-1}^⊣
if r /* (P5): remote congestion */
    T_{L-1}^⊢ ← nan; L ← L-1
else if C /*A (P1): expand */
    if L < L* - I and T_{L+1}^⊣ > T
        T_{L+1}^⊣ ← nan; L ← L+1
else /* (P2): contract */
    if L > 0 and ¬C_{L-1}
        T_{L-1}^⊢ ← nan; L ← L-1
return N_L /*(P6): rapid scaling */
```

| FIG. 4A | FIG. 4B |

403 procedure *checkLoadChangeViacongestion(C)*
  if $P_L = P - 1$ and $C_L \neq C$
    return $C$ ? *MoreLoad* : *LessLoad*
  if $P_{L+1} = P - 1$ and $C_{L+1}$ and $-C$
    return *LessLoad*      403-A
  if $P_{L-1} = P - 1$ and $-C_{L-1}$ and $-C$
    return *MoreLoad*
  return *Unknown*
Require: $T$: current throughput procedure *checkLoadChangeviathroughput(T)*
  if $P_L = P - 1$
    if $T < T_L^{\vdash}$
      if $(T_L^{\vdash} - T) > s * (N_L - N_{L-1}) * (T_L^{\vdash} / N_L)$
        return *LessLoad*
    else
      if $(T - T_L^{\vdash}) > s * (N_{L+1} - N_L) * (T_L^{\vdash} / N_L)$
        return *MoreLoad*
  if $P_{L+1} = P - 1$ and $T > T_{L+1}^{\dashv}$
    return *MoreLoad*      403-B
  if $P_{L-1} = P - 1$ and $T < T_{L-1}^{\dashv}$
    return *LessLoad*

```
procedure migrate(i,N,Si,H)
$H_N \leftarrow H(N)$
/* Lend phase */
for each store $s_i^k \in Si$ do
  $\forall_{j \neq i, j \in [0..N)} \Delta_{i \to j}^k \leftarrow \{\tau | HN(\tau) = j \wedge \tau \in s_i^k\}$
  $\forall_j s_i^k \leftarrow s_i^k \setminus \Delta_{i \to j}^k$
  Save $\Delta_{i \to j}^k$ to backing store
verticalBarrier()
/* Borrow phase */
for each store $s_i^k \in Si$ do
  $\forall j \neq i, j \in [0..N)$ retrieve $\Delta_{j \to i}^k$ from backing store
  $\forall_j s_i^k \leftarrow s_i^k \cup \Delta_{j \to i}^k$
verticalBarrier()
if i=0
horizontalBarrier()
```

FIG. 5

ELASTIC AUTO-PARALLELIZATION FOR STREAM PROCESSING APPLICATIONS BASED ON MEASURED THROUGHPUT AND CONGESTION

CROSS-REFERENCE TO RELATED APPLICATION

Thus application is a continuation of application Ser. No. 13/903,211, filed on May 28, 2013, the disclosure of which is incorporated by reference in its entirety.

BACKGROUND

1. Technical Field

The present disclosure relates to the data stream processing, and more particularly to data processing using parallel elastic operators.

2. Discussion of Related Art

As the world becomes more interconnected and instrumented, there is a deluge of data coming from various software and hardware sensors in the form of continuous streams. Examples can be found in several domains, such as financial markets, telecommunications, surveillance, manufacturing, and healthcare. In all of these domains, there is an increasing need to gather, process, and analyze these data streams to extract insights as well as to detect emerging patterns and outliers. More importantly, this analysis often needs to be performed in near real-time.

Stream computing is a computational paradigm that enables carrying out of analytical tasks in an efficient and scalable manner. By taking the incoming data streams through a network of operators placed on a set of distributed hosts, stream computing provides an on-the-fly model of processing. The frequent need for handling large volumes of live data in short periods of time is a major characteristic of stream processing applications. Thus, supporting high throughput processing is an important requirement for streaming systems. It requires taking advantage of multiple host machines to achieve scalability. This requirement will become even more prominent with the ever increasing amounts of live data available for processing. The increased affordability of distributed and parallel computing, thanks to advances in cloud computing and multi-core chip design, has made this problem tractable. However, this requires language and system level techniques that can effectively locate and efficiently exploit parallelization opportunities in stream processing applications.

BRIEF SUMMARY

According to an exemplary embodiment of the invention, a method of adjusting a data parallel region of a stream processing application includes: measuring congestion of each parallel channel of the data parallel region, measuring a total throughput of all the parallel channels, and adjusting the number of parallel channels based on the current measured congestion and throughput.

In an embodiment, each parallel channel comprises a computer operator and all the computer operators perform a same function. In an embodiment, the adjusting includes adjusting the number of parallel channels based on the current measured congestion and throughput and previous historical measurements of the congestion and throughput.

According to an exemplary embodiment of the invention, a method of adjusting a level of parallelism of an application operating on a system includes determining a current number of operators of the application for operating on a same task, determining a congestion level of the system, increasing a current number of operators of the application if the congestion level exceeds a threshold, and decreasing the current number of operators if the congestion level does not exceed the threshold.

In an embodiment, the method includes determining whether the congestion level of the system has improved after increasing the current number of operators and decreasing the current number of operators if the congestion level has not improved.

BRIEF DESCRIPTION OF THE SEVERAL VIEWS OF THE DRAWINGS

Exemplary embodiments of the invention can be understood in more detail from the following descriptions taken in conjunction with the accompanying drawings in which:

FIG. 1A illustrates an exemplary streaming application.

FIG. 1B illustrates the exemplary streaming application with a parallel data region.

FIG. 2 illustrates exemplary code for an exemplary operator in the parallel data region.

FIG. 3 illustrates a method of adjusting a level of a parallelism in an application according to an exemplary embodiment of the invention.

FIG. 4A and FIG. 4B illustrate exemplary code that may be used to implement the method of FIG. 3.

FIG. 5 illustrates exemplary code that may be used to migrate state information among operators of the parallel data region.

DETAILED DESCRIPTION

Figure 6:
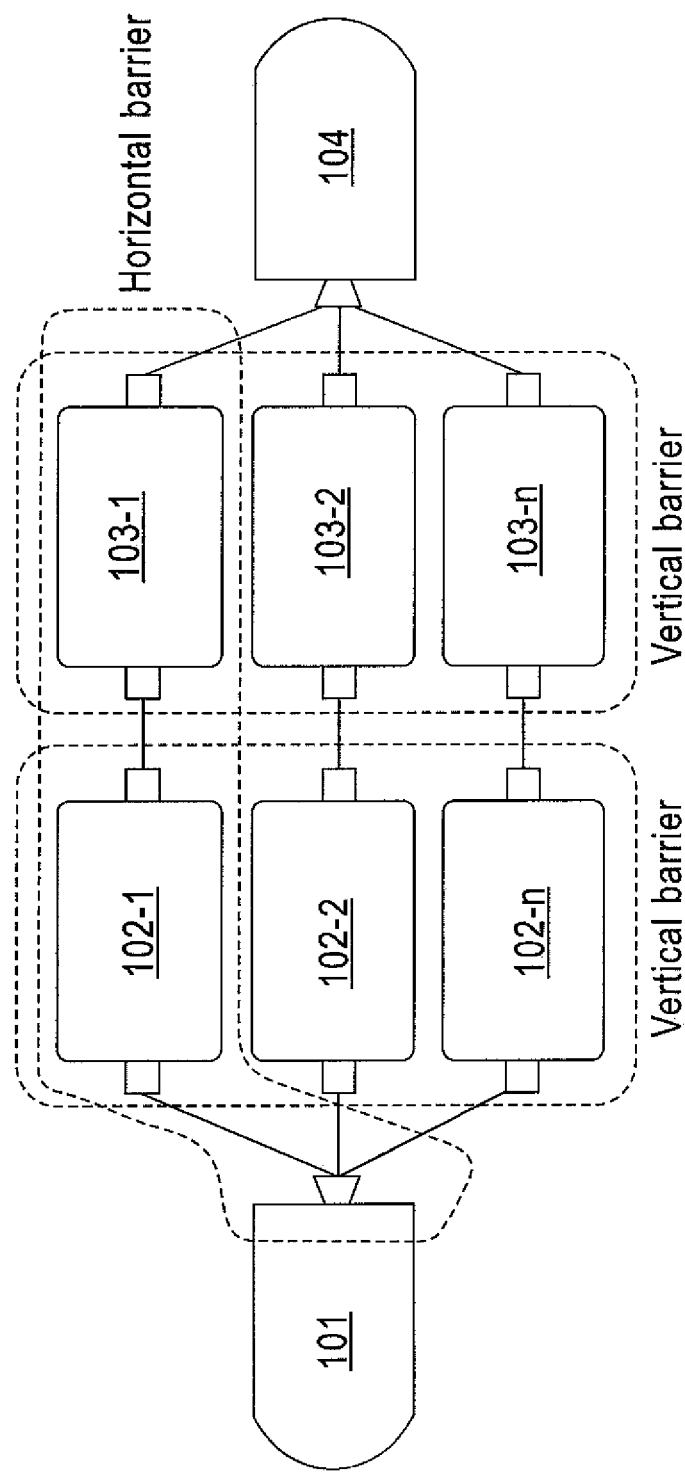
FIG. 6 illustrates barriers used to prevent the level of parallelism from being adjusted until after the operators have migrated their state information.

Exemplary embodiments of the invention provide language and system level techniques that can effectively locate and efficiently exploit parallelization opportunities in stream processing applications.

A streaming application may be structured as a directed graph where vertices are operators and edges are data streams. For example, a vertex or node of the graph performs an operation on input data and provides a result of the operation to its output edge as an output data stream. A system can scale a streaming application by deciding how the application graph will be mapped to a set of available hosts.

Auto-parallelization is an effective technique that can be used to scale a streaming application in a transparent manner. It involves detecting parallel regions in the application graph that can be replicated on multiple hosts, such that each instance of the replicated region (e.g., hereinafter referred to as a channel) handles a subset of the data flow to increase throughput. This form of data parallelization involves detecting parallel regions without direct involvement of the application developer and applying runtime mechanisms to ensure safety. The parallelized application should produce the same results as a sequential application.

Transparent auto-parallelization that improves performance should have some profitability mechanism. In a streaming data-parallel region, profitability involves determining the right degree of parallelism, that is, the number of parallel channels that are to be used, without explicit involvement of the application developer.

In at least one embodiment of the invention, auto-parallelization is elastic since it makes the profitability decision adaptive to runtime dynamics (e.g., changes in workload and availability of resources).

At least one embodiment of the invention achieves elastic auto-parallelization in in the presence of stateful operators. A stateful operator is an operator that performs a function that relies on state information. For example, if the stateful operator is configured to generate a tax return, many of its calculations may depend on the current state of an individual's gross income. Thus, if the stateful operator is duplicated so some of the calculations can be offloaded to the duplicated operator, the current state of the gross income would need to be communicated (migrated) to the duplicated operator. However, migration of such state information can be very burdensome. Thus, at least one embodiment of the invention attempts to minimize the amount of state information that needs to migrated to a stateful operator to minimize time and space overheads.

At least one embodiment of the invention attempts to provide a control algorithm to determine the degree of parallelism that exhibits stability (i.e., does not oscillate the number of channels used), achieves good accuracy (i.e., finds the number of channels that maximizes the throughput), has a short settling time (i.e., reaches a stable number of channels quickly), and avoids overshoot (i.e., does not use more channels than necessary).

A stateful operator can be partitioned into partitioned stateful operators, which store an independent state for each substream identified by a partitioning attribute. Examples of such operators include an operator to partition network traces by IP number, partition financial streams by ticker, etc. Compile-time re-write techniques can be developed to convert high-level user code into an equivalent version that use an API that shields application developers from the details of state migration.

In at least one embodiment of the invention, an operator is split using a hashing algorithm, which minimizes the amount of state information migrated. Further, an embodiment of the invention relies on two local metrics computed at the splitter: the congestion (e.g., a measure of blocking time at the splitter) and the throughput. The congestion may indicate how busy a particular operator is.

In an embodiment of the invention, the splitter is a run-time component that is co-located with the operator that is generating the stream to be split for parallel processing. The control algorithm can work at the splitter and use these metrics to adjust the number of channels to be used for processing the flow. The algorithm may include peeking up and down in terms of the number of channels used based on changes in observed metrics to address accuracy and overshoot; remembering past performances achieved at different operating points to address stability; and rapid scaling to address settling time.

At least one embodiment of the invention provides an elastic auto-parallelization scheme that can handle stateful operators, works across multiple hosts, and is designed for general purpose stream processing applications.

Embodiments of the invention will be discussed with respect to the System S middleware and its programming language SPL for ease of discussion. However, embodiments of the invention are not limited to any particular middleware or programming language.

SPL is a programming language used to develop stream processing languages. SPL applications are composed of operator instances connected to each other via stream connections. An operator instance is a vertex in the application's data flow graph. An operator instance is a realization of an operator definition. For example, FIG. 1A and FIG. 1B show an instance of the TCPSource operator 101. In general, operators can have many different instantiations, each using different stream types, parameters, or other configurations such as windows. Operator instances can have zero or more input and output ports. Each output port generates a uniquely named stream, which is a sequence of tuples. Connecting an output port to the input of an operator establishes a stream connection. A stream connection is an edge in an application's data flow graph.

Operators are implemented either directly in SPL or in a general purpose programming language. These implementations rely on an event driven interface, which reacts to tuples arriving on operator input ports. Tuple processing generally involves updating some operator-local state and producing result tuples that are sent out on the output ports.

System S is a distributed stream processing engine that can execute SPL applications using a set of distributed hosts. System S can perform various runtime tasks, such as data transport, scheduling, fault-tolerance, and security.

Auto-parallelization is the process of automatically discovering data-parallel regions in an application's flow graph which can be exploited at runtime. In addition to discovering these parallel regions, the compiler establishes certain properties required to activate appropriate runtime mechanisms that will ensure safety of the auto-parallelization. For instance, if a parallel region is determined to be stateless, the runtime data splitting mechanism to be applied can be round-robin, whereas if the region is partitioned stateful, the data splitting is performed using a hash-based scheme.

FIG. 2 illustrates sample SPL code 200 for an exemplary auto-parallelization process named OpMon. An instance of the TCPSource operator 101 is used to receive a stream that contains information about network usage of different applications. This is followed by an Aggregate operator instance 102, which computes minute-by-minute data usage information for each application, using an application identifier (e.g., appId) as the partitioning key. In FIG. 1A the aggregated results are taken through a Filter operator 103 to retain applications whose network usage is beyond a threshold. Finally, the end results are sent to a TCP Sink operator instance 104.

In FIG. 1B the Aggregate operator 102 and filter operator 103 are duplicated to form a parallel region including parallel channels, where each parallel channel contains a copy of the aggregate operator and the filter operation. For example, FIG. 1B illustrates parallel channels including a first parallel channel (e.g., 102-1 and 103-1), a second parallel channel (e.g., 102-2 and 103-2), and an $n^{th}$ parallel channel (e.g., 102-n and 103-n).

In this example, there is an additional operator TCPSink 104 that follows the parallel region. Further, since the operator TCP Sink 104 may not be able to tolerate out of order results, the parallel region needs to maintain the order of tuples at its output. This is achieved at the merger 106, which resides on the input port of the operator succeeding the parallel region. The merger 106 performs a re-ordering operation using sequence numbers which were assigned at the splitter 105 and carried through the parallel region.

This parallel region contains Filter operators 103-1, 103-2, ..., 103-n that can drop some of the tuples. This results in a selectivity value of at most 1. This may cause the merger 106 to block for long periods of time, if the tuples for a given channel happen to get dropped with a higher frequency than others. This is because during times of no tuple arrival, the merger 106 cannot differentiate between tuples that take a long time to arrive and tuples that will never arrive (dropped). Accordingly, in at least one embodiment of the invention, the parallel region uses pulses, which are special markers periodically sent by the splitter 105 and used by the merger 106 to avoid lengthy stalls.

At least one embodiment of the invention makes the profitability decision (e.g., determines whether it is more profitable to increase or decrease the level of parallelism) at runtime, where information regarding workload and resource availability can be inferred. When an application starts its execution, the number of parallel channels is set to a pre-defined value (e.g., 1). A control algorithm is placed as the splitter 105 periodically re-evaluates the number of channels to be used based on local run-time metrics it maintains. The control algorithm can decide to increase or decrease the number of channels used based or take no action. When the number of channels to use changes, then a state migration protocol can be executed if the parallel region is stateful.

For parallel regions that are partitioned stateful, changing the number of parallel channel necessitates partial relocation of state information. For instance, if the number of parallel channels increases, then the assignment of some of the partitions needs to move from the existing parallel channels to the new parallel channels. Whenever such change of assignment happens at the splitter 105, the state information associated with the moved partitions has to be relocated as well. In particular, the newly added parallel channels need to borrow state information of the partitions assigned to them from the existing parallel channels. Similarly, when existing channels are removed, the state information associated with the partitions they were handling has to be redistributed to the existing parallel channels.

In an exemplary embodiment, where each partition is owned by a single parallel channel, partitions are assigned to parallel channels using consistent hashing to minimize the amount of state information moved during migration.

As discussed above, the control algorithm performs a periodic evaluation to determine whether to increase or decrease the current level of a parallelism. In an exemplary embodiment of the invention, the control algorithm relies on two locally generated metrics, namely Congestion and Throughput.

Congestion is an indication of whether the splitter 105 observes an undue delay when sending tuples on a connection. Presence of congestion may be an indication that more channels are needed to handle the current load. Similarly, lack of congestion may be an indication that too many channels are being used. For example, in an optimal situation, a channel is busy, but not overly burdened or underused. Temporal changes in the congestion value can indicate changes in the workload availability. For example, if several parallel channels have a moderate congestion (i.e., busy, but not overly burdened or underused) at a first time and then each of the channels have a minimal congestion (i.e., underused) at a second time, one can infer that the overall workload has decreased considerably.

The congestion can be computed by using non-blocking I/O for transferring tuples. For example, a blocking period can be calculated from a difference between a first time a send call provides a notification that the call would block and a second time the send call provides a notification that room is available. The congestion value can then be based on the measured blocking period as it compares to comparison thresholds or ranges. For example, if the blocking period is more than one second it could be deemed a congestion value of 1 (i.e., indicating excessively congested), if the blocking period is between 0.5 second and 1 second it could be deemed a congestion value of 0.5 (i.e., moderately congested), and if the blocking period is less than 0.5 seconds, it could be deemed a congestion value of 0 (i.e., minimal congestion). Please note that the above-provided comparison thresholds/ranges are merely examples as the calculation of congestion is not limited to any particular threshold/range.

Throughput is the number of tuples processed per second over the last adaptation period. For example, at a given time when the number of channels has been increased or decreased (e.g., a particular operating point), a current throughput compared to a previous throughput can indicate whether throughput has improved. Further, temporal changes in throughput can indicate changes in the workload. For example, if throughput typically averages 10,000 tuples per second and then begins averaging 1,000 tuples per second, it can be inferred that the workload has been decreased considerably.

At least one embodiment of the invention increases the level of parallelism if congestion is present unless that increase was already tried and it was not found to be beneficial and decreases the level of parallelism if no congestion is present unless that decrease was already tried and it was not found to be beneficial.

FIG. 3 illustrates a method for controlling the number of parallel channels according to an exemplary embodiment of the inventive. Initially, the method begins with a certain number of channels $N_L$ (e.g., 2) (S301). Next, the method forgets obsolete information (S302). For example, if it was previously determined that a current congestion level indicates that the workload has changed, the prior snapshots of the previous congestion levels are deleted. Similarly, if a current throughput level indicates that the workload has changed, the prior snapshots of the previous throughput levels are deleted.

Next, the method determines whether the current number of channels in use (e.g., 2) are congested (e.g., being overworked) (S303). If the current number of channels in use are not congested (e.g., under utilized), the method determines whether the previous lower number of channels (e.g., 1) was congested (e.g., overworked) (S304).

If the previous lower number of channels was not congested (e.g., under utilized), the method decreases the level of parallelism by reverting to the previous lower number of channels (e.g., 1) (S309). If the previous lower number of channels was also congested, the current level of parallelism is maintained since using a lesser number of channels will not improve congestion.

If the current number of channels in use was congested, the method determines whether this congestion is remote congestion (S305). Remote congestion means that the congestion is attributed primarily due to an application/process that is external to the parallel operators. If it is determined that the congestion is attributed to the remote congestion, the method decreases the level of parallelism by reverting to the previous lower number of channels (S306). This step avoids the case where the number of channels is continuously increased due to the continued presence of congestion, yet the throughput does not improve. Since the only congestion left is due to remote congestion, the streaming application has hit a scalability limit. For example, the original bottleneck introduced by the streaming application has been removed due to parallelization and the bottleneck has moved to a non-parallelization portion (e.g., the source or sink of some stateful operator) of the application.

If it is determined that the congestion is not attributed to remote congestion, the method determines whether the throughput at a next higher number of channels is higher than the current amount of throughput or unknown (S307). For example, if the next higher number of channels (e.g., 3) was never used or the corresponding throughput data became obsolete, this data would not be present. If the throughput at the next higher number of channels is higher than the current amount of throughput or unknown, the method increases the level of parallelism by increasing the number of channels (e.g., to 3) (S308). However, if the throughput at the next higher number of channels is the same or lower, the method maintains the current level of parallelism.

In cases where the available resources (e.g., execution contexts such as hosts and cores) and the cost of the parallel region are both high, the optimal number of channels can be high as well. Thus, in practice it could take a long time for the above-described control algorithm illustrated in FIG. 3 to reach this number. This is due to the one-channel-at-a-time nature of the algorithm. In an alternate embodiment of the algorithm of FIG. 3, rapid scaling is introduced. In rapid scaling, rather than operating (e.g., increasing/decreasing) one-channel-at-a-time, one can operate (e.g., increase/decrease) one-level-at-a-time, where a super-linear mapping is defined between the number of levels and channels. For example, one level can correspond to more than one channel. For example, in this way steps S306, S308, and S309, can increase/decrease the current number of channels by more than one. Rather, than using the number of channels as the operating point, the method of FIG. 3 can use a level, which is mapped to the number of channels via function $N_L$. In an exemplary embodiment of the invention, the function $N_L$ is defined by Equation 1 as follows:

$$N_L = [0.5 + 2^{0.5*(L+1)}] \quad \text{[Equation 1]}.$$

If the above function $N_L$ is used, for increasing level L values starting at 0 (1 by 1) results in the following series of number of channels: $\{1, 2, 3, 4, 6, 8, 11, 16, 23, 32, \ldots\}$. Thus, if the method of FIG. 3 were to determine that is necessary to increase the level of the parallelism in five steps, the first three steps would increase the number of channels by 1 and the next two steps would increase the number of channels by 2. However, embodiments of the invention are not limited to any particular function $N_L$ since it is possible to use other functions that follow a steeper or less steep curve depending on the maximum number of channels and the settling time requirements.

In an exemplary embodiment, the method of FIG. 3 is implemented as a computer program that stores three state variables. FIG. 4A and FIG. 4B illustrate an example of the program 400 including initialization code 401 to initialize the state variables, first code 402 to update the number of channels, and second code 403 to detect workload changes. The first code takes as input parameters the current throughput (T) and the current congestion status (C).

The first state variable P is the current adaptation period. The second state variable L represents the current level. The third state variable is an array that stores information for each level, namely the last adaptation period $P_i$ during which the algorithm was at this level, whether congestion, denoted $C_i$, was observed the last time the algorithm was at this level, the throughput $T_i^{|-|}$ observed the last time the algorithm was at this level, and the throughput $T_i^{|-}$ observed during the first of the periods the last time the algorithm stayed consecutive periods at this level. The parameter L* denotes the maximum number of levels.

The program 400 has a global parameter called change sensitivity, denoted by $\alpha$, which determines what a significant change means and takes a value in the range [0, 1]. A value of 1 means the algorithm is very sensitive to small changes in the throughput. For instance, a minor improvement in throughput will be sufficient to increase the number of channels if the sensitivity is high. In an exemplary embodiment, all changes in throughput are normalized against the ideal throughput for a single channel in a linearly scaling system.

The second code 403 includes code 403-A to detect load changes based on congestion status. If the current level and the last level are the same, yet the congestion status has changed, this is taken as an indication of load change (e.g., load increased if there is congestion currently, load decreased otherwise). If the current level is lower than the last one, yet the congestion has disappeared, this is taken as a load decrease. If the current level is higher than the last one, yet the congestion has appeared, this is taken as a load increase. The second code includes code 403-B to detect load changes based on throughput. If the current level and the last level are the same, yet there is a significant change in the throughput, this is taken as an indication of load change (e.g., load increase if the current throughput is higher, load decrease otherwise). Change sensitivity is used to detect significant change relative to the ideal change in a linearly scaling system. If the current level is lower than the last one, yet the throughput has increased, this is taken as a load increase. If the current level is higher than the last one, yet the throughput has decreased, this is taken as a load decrease.

A state management application programmer interface (API) can be developed for use by a compiler when generating code for an elastic operator to enable elastic parallelism. The API may include a partitioned state clause to specify the list of state variables to be maintained on a per-partition basis and a partitionBy parameter to specify the partitioning attribute to be used for the partitioned state. For operators that are developed in general purpose programming languages, such as C++ and Java, the API may be provided as a native interface.

As discussed previously, when the number of channels is increased it may be necessary to migrate state information from an existing operator corresponding to the lower number of channels to a new operator that is created by increasing the number of channels. A migration protocol may be executed for a parallel region (e.g., the set of operators corresponding to the current number of channels) in response to the decisions made at the splitter 105 by the control algorithm (see method FIG. 3). When the control algorithm updates the number of channels, it also updates the data partitioning function it uses to distribute the partitions among the parallel channels and initiates the migration protocol. The migration is only needed for the case of partitioned stateful parallel regions. The migration protocol is initiated by sending a migration pulse from the splitter 105 to all parallel channels. When an operator in a parallel channel receives a migration pulse, it first forwards the pulse downstream and then starts executing the per-operator migration protocol. This makes it possible to execute migration of state information between replicas of multiple operators in parallel, in case the parallel region contains more than one partitioned stateful operator.

An exemplary embodiment of a migrate routine 500 illustrated in FIG. 5 provides pseudo-code for the migration protocol executed by an operator. There are four input parameters to the routine. The first is the index of the operator's parallel channel, denoted by i. The second is the new operating point in terms of the number of channels, denoted by N. The third is the state kept locally at this operator, which consists of a list of managed stores, denoted by $S_i$ where $s_i^k \in S_i$ denotes one of the stores. The last is the data partitioning function generator, which generates a data partitioning function given the number of parallel channels, denoted by H. The protocol has two phases, namely the lend phase and the borrow phase.

In the lend phase, the items that do not belong to the current operator after the data partitioning function has been updated based on the new number of channels, are collected into a package $\Delta_{i \to j}^k$, which represents the set of data items in $s_i^i$ that needs to migrate from the operator replica running on the $i^{th}$ channel to replicate running on the $j^{th}$ channel. These items are removed from the in-memory store $s_i^k$. The resulting packages are stored on a backing store and then a vertical barrier is performed across replicas of the operator. This ensures that all replicas complete the lend phase before the borrow phase starts.

In the borrow phase, packages in the backing store that are destined to the current operator replica are retrieved and the in-memory stores are updated. For instance, items in package $\Delta_{i \to j}^k$ are added to the store $s_i^k$. A vertical barrier is performed to ensure all replicas have completed the borrow phase. Once complete, a horizontal barrier is performed, in order to ensure that the splitter does not start sending tuples before the migration is complete. This barrier is performed across the master operator replicas (at index 0) and the splitter.

FIG. 6 illustrates a parallel region with 2 operators (e.g., 102 and 103) and N parallel channels. During a vertical barrier each operator synchronizes with its N−1 replicas, whereas during a horizontal barrier the 2 operators on channel 0 synchronize with the splitter. This implementation of the migration protocol works across multiple machines and does not rely on shared memory. It at least one embodiment of the invention, the implementation makes use of a back-end database for state information movement and synchronization. Alternative implementations are possible (e.g., sockets or a message passing interface MPI). While FIG. 6 illustrates a parallel region with 2 operators, in alternate embodiments, the parallel region could have a single operator or more than 2 operators.

Data partitioning is performed at the splitter 105 for partitioned stateful regions. The partitioning function of the splitter 105 needs be updated when the number of parallel channels changes. The choice of the partitioning function impacts the cost of the migration, as it changes the amount of migrated state information. The partitioning function can apply a hash function on the partitioning attributes and mod the result based on the number of channels. However, this data partitioning function may result in massive state information migrations and movement of some partitions across channels that are present both before and after the migration.

Thus, a data partitioning function according to at least one embodiment of the invention provides good balance and monotonicity. Balance ensures that the partitions are uniformly distributed across channels, achieving good load balance. Monotonicity ensures that partitions are not moved across channels that are present before and after the migration. Consistent hashing is a technique that provides these properties. Consistent hashing maps each data item to a point on a 128-bit ring in uniformly random fashion. Similarly, each channel is also mapped to the same ring, but rather than to a single point, each channel is mapped to multiple points on the ring (using multiple hash functions). A data item is assigned to the channel that is closest to it on the ring. As a result of this scheme, when a new channel is inserted, it borrows data items from multiple of the existing channels. Similarly, when a channel is removed, its data items are distributed over multiple of the existing channels. Consistent hashing ensures that on average M/N partitions are moved when the Nth channel is inserted or removed from a system with M partitions. Consistent hashing can be implemented in O(1) time by dividing the ring into segments, yet it is slightly more costly to compute as compared to a simple hashing scheme. However, it minimizes the amount of state information to be moved during migration.

Figure 7:
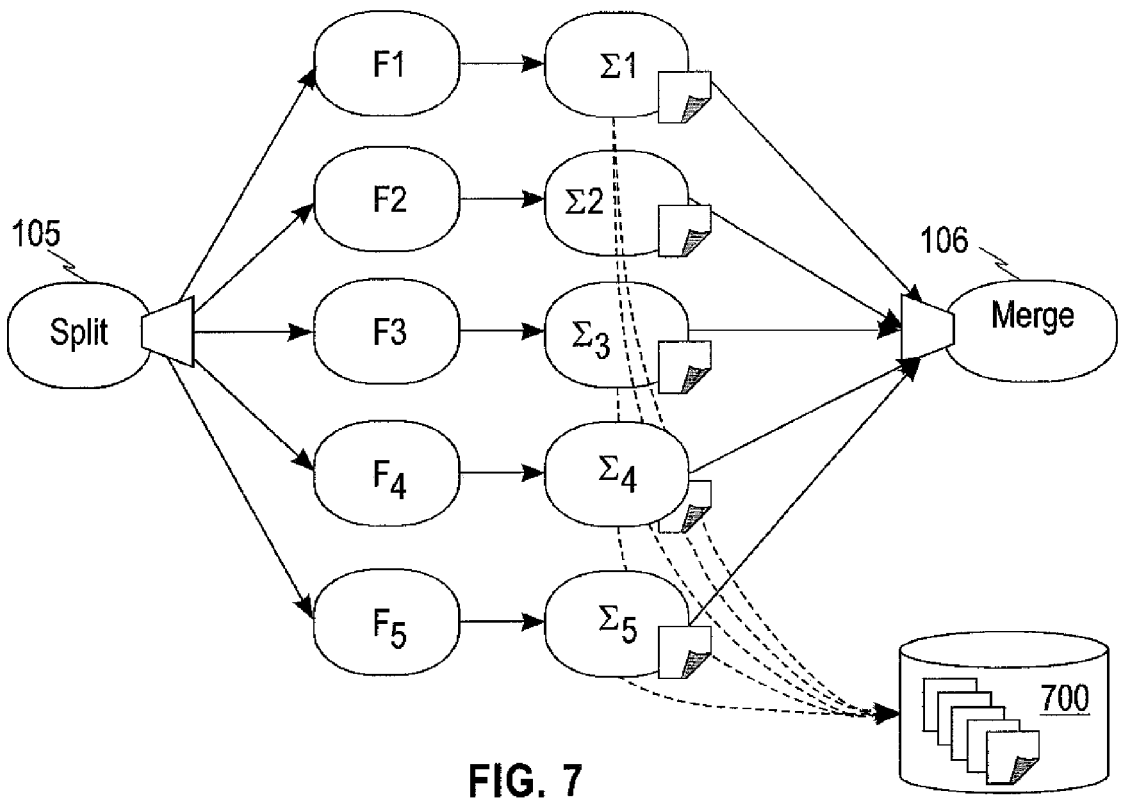
FIG. 7 illustrates an embodiment where a shared storage is used to exchange state information among the operators according to an exemplary embodiment of the invention.

While the inventive concept has been described with respect to a parallel region including an aggregate operator and a filter operator, the inventive concept is not limited to any particular set of operators or functions thereof. For example, FIG. 7 shows a generic example, where the first parallel channel includes two operators $F_1$ and $\Sigma_1$, the second parallel channel includes two operators $F_2$ and $\Sigma_2$ the third parallel channel includes operators $F_3$ and $\Sigma_3$, and the $n^{th}$ operator includes two operators FN and $\Sigma$N. As discussed above, a parallel region may only include a single operator (e.g., only $F_1$-FN). FIG. 7 additionally illustrates a storage 700 that is used to store state information from an operator that needs to be migrated to another operator in a parallel channel. The operators can store and retrieve state information from the shared storage 700. If the number of channels is to change, the existing operators need to store their state information in the storage 700 beforehand. If the number of channels is then increased, the new operator can retrieve any necessary state information from the storage 700. If the number of channels is instead decreased, then the remaining operators can retrieve state information from the storage 700 that was being retained by the deleted operator. A barrier can be used to delay the deletion of an operator until it has had time to store its state information in the storage 700. A barrier can also be used to delay propagation of data to a set of the operators ($F_1$-FN) until after they have retrieved the necessary state information from the storage 700.

Figure 8:
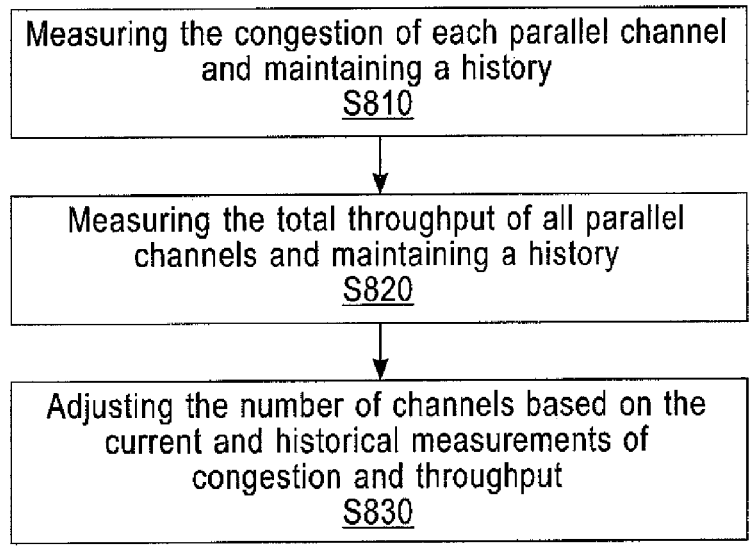
FIG. 8 illustrates a method of adjusting a level of parallelism in an application according to an exemplary embodiment of the invention.

FIG. 8 illustrates a method for dynamically adjusting the number of parallel channels for a data parallel region of a stream processing application according to an exemplary embodiment of the invention. The method includes: measuring the congestion of each parallel channel at a current period and maintaining a history (S801), measuring the total throughput of all parallel channels at the current period and maintaining a history (S802), and adjusting the number of channels based on the current and historical measurements of congestion and throughput (S803).

In at least one embodiment, the adjusting of the number of channels includes a splitter communicating to existing parallel channels to start state migration, each channel determining what state information it needs to retain and sending that state information to other channels that need this state information, and each channel receiving the state information that it needs.

In an exemplary embodiment, the adjusting of the number of channels includes increasing the number of channels only if there is current congestion that is not remote congestion, and there is no historical throughput data for the higher number of channels.

In an exemplary embodiment, the adjusting of the number of channels includes increasing the number of channels only if there is current congestion that is not remote, and the historical throughput indicates that it is profitable to increase the number of channels. For example, if throughput in the past has improved by increasing the current number of channels, then it makes sense to once again increase the current number of channels.

In an exemplary embodiment, the adjusting of the number of channels includes decreasing the number of channels if there is current congestion and the congestion is remote. For example, if the number of channels was previously increased, and it could not remove the current congestion because it is remote congestion, the number of channels can be decreased.

In an exemplary embodiment, the adjusting of the number of channels includes decreasing the number of channels only if there is no congestion, and the historical data indicates that there was congestion at the lower number of channels.

In an exemplary embodiment, the adjusting of the number of channels maintains the same number of channels if there is no current congestion, and the historical data indicates that there was congestion at the lower number of channels.

In an exemplary embodiment, the adjusting of the number of channels maintains the same number of channels if there is current congestion that is not remote congestion, and the historical data indicates that it is not profitable at the higher number of channels. Thus, even though the congestion is not remote, since in the past increasing the number of channels has not improved this local congestion, the number of channels can be kept at their current value.

The method can adapt to work load changes by selectively forgetting the historical measurements of congestion and/or throughput that have become obsolete. For example, if the measurements were taken at one workload level, and the workload has since changed, the old measurements should be disregarded. In an exemplary embodiment, if the workload has increased (e.g., by more than a certain threshold), the measurements for the historical congestion and throughput from the higher number of channels is discarded. In another exemplary embodiment, if the workload has decreased (e.g., by more than a certain threshold), the measurements for the historical congestion and throughput from the lower number of channels is discarded.

The above described operators may be computer software threads or computer processes.

Figure 9:
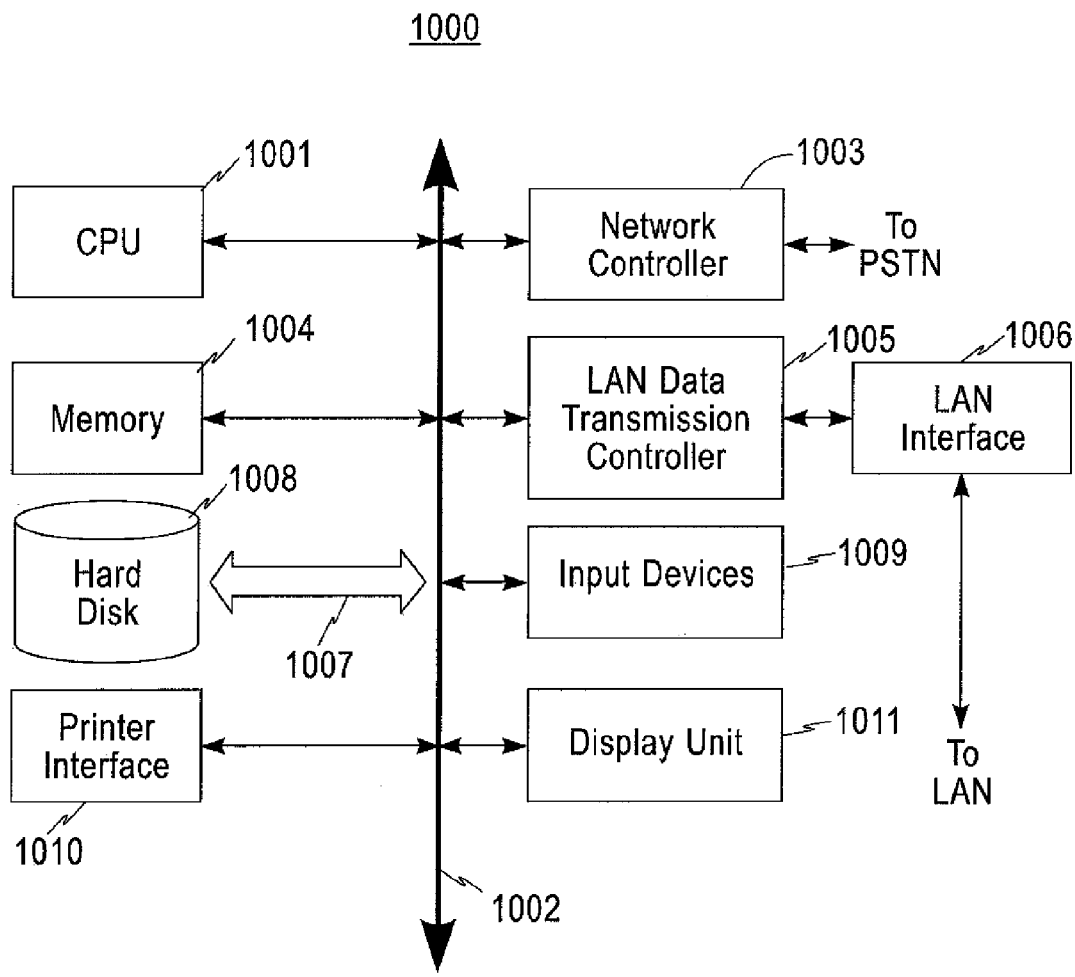
FIG. 9 illustrates an example of a computer system capable of implementing methods and systems according to embodiments of the disclosure.

FIG. 9 illustrates an example of a computer system, which may execute any of the above-described operators, methods or computer programs, according to exemplary embodiments of the invention. For example, the operators of FIGS. 1A, 1B, 6, and 7, the code of FIGS. 2, 4A, 4B, and 5, and the methods of FIGS. 3 and 8 may be implemented in the form of a software application running on the computer system. Further, portions of the methods may be executed on one such computer system, while the other portions are executed on one or more other such computer systems. Examples of the computer system include a mainframe, personal computer (PC), a handheld computer, a server, etc. The software application may be stored on a computer readable media (such as hard disk drive memory 1008) locally accessible by the computer system and accessible via a hard wired or wireless connection to a satellite or a network, for example, a local area network, or the Internet, etc.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008 (e.g., a digital video recorder), via a link 1007. CPU 1001 may be the computer processor that performs the above described methods.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for adjusting a data parallel region of a stream processing application, the computer program product comprising a non-transitory computer readable storage medium having program code embodied therewith, the program code executable by a processor, to perform method steps comprising:
measuring congestion of each parallel channel of the data parallel region;
measuring a total throughput of all the parallel channels; and
adjusting the number of parallel channels based on the current measured congestion and throughput,
wherein each parallel channel comprises a same at least one software operator that performs an operation on a stream of data received from an input operator,
wherein measuring the congestion for a given channel comprises calculating a blocking period from a difference between a first time a send call across the channel provides a notification that the call will block and a second time the send call across the channel provides a notification that room is available.

2. The computer program product of claim 1, wherein each parallel channel comprises a same sequence of software operators that perform operations, a first operator of each sequence receives an output of an input operator, and a last operator of each sequence provides an output to a same output operator.

3. The computer program product of claim 2, where the first operator of a given sequence performs an operation on the output from the input operator and provides a result of the operation to a subsequent operator in the sequence.

4. The computer program product of claim 1, wherein the congestion of a given channel indicates how utilized that channel is.

5. The computer program product of claim 1, wherein the adjusting occurs during an adaptation period, and the throughput of a given channel is a number of tuples processed by the operators of the channel during the adaptation period.

6. The computer program product of claim 1, wherein when the congestion for a current number of the channels exceeds a threshold, the adjusting comprises:
determining whether the congestion is remote by determining whether the congestion is attributed primarily to an application that is external to the operators;
decreasing the number of channels when it is determined that the congestion is remote;
determining whether the throughput at a next higher number of the channels is higher than the measured throughput when it is determined that the congestion is not remote;
increasing the number of channels when it is determined that the throughput at the next higher number of the channels is higher; and
maintaining the current number of channels when it is determined that the throughput at the next higher number of the channels is not higher.

7. The computer program product of claim 1, wherein the adjusting is based only on historical measurements of the congestion and the throughput taken at workload levels within a certain threshold of a current workload level.

8. A computer program product for adjusting a data parallel region of a stream processing application, the computer program product comprising a non-transitory computer readable storage medium having program code embodied therewith, the program code executable by a processor, to perform method steps comprising:
measuring congestion of each parallel channel of the data parallel region;
measuring a total throughput of all the parallel channels; and
adjusting the number of parallel channels based on the current measured congestion and throughput,
wherein each parallel channel comprises a same at least one software operator that performs an operation on a stream of data received from an input operator,
wherein when the congestion for a current number of the channels is lower than a threshold, the adjusting comprises:
determining whether a previous lower number of the channels was congested;
decreasing the number of channels when it is determined that the previous lower number of the channels was not congested; and
maintaining the current number of channels when it is determined that the previous lower number of the channels was congested.

9. The computer program product of claim 8, wherein each parallel channel comprises a same sequence of software operators that perform operations, a first operator of each sequence receives an output of an input operator, and a last operator of each sequence provides an output to a same output operator.

10. The computer program product of claim 9, where the first operator of a given sequence performs an operation on the output from the input operator and provides a result of the operation to a subsequent operator in the sequence.

11. The computer program product of claim 9, wherein the congestion of a given channel indicates how utilized that channel is.

12. The computer program product of claim 8, wherein the adjusting occurs during an adaptation period, and the throughput of a given channel is a number of tuples processed by the operators of the channel during the adaptation period.

13. A computer program product for adjusting a data parallel region of a stream processing application, the computer program product comprising a non-transitory computer readable storage medium having program code embodied therewith, the program code executable by a processor, to perform method steps comprising:
  measuring congestion of each parallel channel of the data parallel region;
  measuring a total throughput of all the parallel channels; and
  adjusting the number of parallel channels based on the current measured congestion and throughput,
  wherein each parallel channel comprises a same at least one software operator that performs an operation on a stream of data received from an input operator,
  wherein when the congestion of a current number of the channels exceeds a threshold, the adjusting comprises:
    determining whether the congestion is remote by determining whether he the congestion is attributed primarily to an application that is external to the operators;
    decreasing the number of channels when it is determined that the congestion is remote; and
    increasing the number of channels when it is determined that the congestion is not remote and the throughput at a next higher number of the channels is unknown.

14. The computer program product of claim 8, wherein each parallel channel comprises a same sequence of software operators that perform operations, a first operator of each sequence receives an output of an input operator, and a last operator of each sequence provides an output to a same output operator.

15. The computer program product of claim 13, where the first operator of a given sequence performs an operation on the output from the input operator and provides a result of the operation to a subsequent operator in the sequence.

16. The computer program product of claim 14, wherein the congestion of a given channel indicates how utilized that channel is.

17. The computer program product of claim 13, wherein the adjusting occurs during an adaptation period, and the throughput of a given channel is a number of tuples processed by the operators of the channel during the adaptation period.

* * * * *